(12) United States Patent
Lee et al.

(10) Patent No.: US 9,956,746 B2
(45) Date of Patent: May 1, 2018

(54) WOOD SHEET AND METHOD FOR MANUFACTURING THE SAME

(71) Applicants: Hyundai Motor Company, Seoul (KR); Kia Motors Corporation, Seoul (KR)

(72) Inventors: Hyo Jin Lee, Busan (KR); Ho Tak Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days. days.

(21) Appl. No.: 14/562,692

(22) Filed: Dec. 6, 2014

(65) Prior Publication Data

US 2015/0165732 A1   Jun. 18, 2015

(30) Foreign Application Priority Data

Dec. 17, 2013  (KR) ........................ 10-2013-0157329

(51) Int. Cl.
| | | |
|---|---|---|
| *B32B 21/14* | (2006.01) | |
| *B32B 5/02* | (2006.01) | |
| *B32B 5/08* | (2006.01) | |
| *B32B 7/12* | (2006.01) | |
| *B32B 15/10* | (2006.01) | |

(Continued)

(52) U.S. Cl.
CPC ............. *B32B 21/14* (2013.01); *B32B 5/022* (2013.01); *B32B 5/08* (2013.01); *B32B 7/12* (2013.01); *B32B 15/10* (2013.01); *B32B 15/20* (2013.01); *B32B 21/10* (2013.01); *B32B 2262/0261* (2013.01); *B32B 2262/0284* (2013.01); *B32B 2307/306* (2013.01); *B32B 2307/54* (2013.01); *B32B 2307/7265* (2013.01); *B32B 2605/00* (2013.01); *Y10T 428/24802* (2015.01)

(58) Field of Classification Search
None
See application file for complete search history.

(56) References Cited

U.S. PATENT DOCUMENTS

| | | | | |
|---|---|---|---|---|
| 5,543,193 A | * | 8/1996 | Tesch ................ | E04F 15/02 156/297 |
| 2003/0162458 A1 | * | 8/2003 | Tsujiyama ........... | B32B 5/26 442/329 |

(Continued)

FOREIGN PATENT DOCUMENTS

| | | |
|---|---|---|
| JP | 03-030921 | 2/1991 |
| JP | 2005-226178 A | 8/2005 |

(Continued)

OTHER PUBLICATIONS

Machine Translation of Korean Patent document KR 10-2011-0077305 via KIPO webiste.*

*Primary Examiner* — Laura C Powers
(74) *Attorney, Agent, or Firm* — Mintz Levin Cohn Ferris Glovsky and Popeo, P.C.; Peter F. Corless

(57) ABSTRACT

Disclose are a wood sheet and a method for manufacturing the wood sheet. In particular, the real wood sheet is prepared with natural wood sheets used for interior and exterior materials, a binder and a stiffener, thereby providing patterned veneer appearance. Further, the wood sheet may have improved physical properties and reduced weight and be manufactured with reduced cost.

8 Claims, 2 Drawing Sheets

(51) Int. Cl.
*B32B 15/20* (2006.01)
*B32B 21/10* (2006.01)

(56) References Cited

U.S. PATENT DOCUMENTS

| | | | |
|---|---|---|---|
| 2004/0048025 A1* | 3/2004 | Lohnes | B29C 67/243 |
| | | | 428/40.1 |
| 2010/0215895 A1* | 8/2010 | Nadkarni | B29C 47/0026 |
| | | | 428/90 |
| 2014/0199529 A1* | 7/2014 | Hoff | B44C 5/0461 |
| | | | 428/196 |

FOREIGN PATENT DOCUMENTS

| | | |
|---|---|---|
| KR | 10-2009-0131431 A | 12/2009 |
| KR | 10-2010-0072676 A | 7/2010 |
| KR | 102011010547 | 9/2011 |
| KR | 10-2012-0114488 | 10/2012 |
| KR | 10-2013-0015356 A | 2/2013 |
| KR | 10-1302395 | 9/2013 |
| KR | 10-1302396 | 9/2013 |

* cited by examiner

WOOD SHEET AND METHOD FOR MANUFACTURING THE SAME

CROSS-REFERENCE TO RELATED APPLICATION

This application claims under 35 U.S.C. § 119(a) the benefit of priority to Korean Patent Application No. 10-2013-0157329 filed on Dec. 17, 2013, the entire contents of which are incorporated herein by reference.

TECHNICAL FIELD

The present invention relates to a wood sheet and a method for manufacturing the real wood sheet. The wood sheet may be prepared with a patterned wood sheet which is used for interior and exterior materials, a binder and a stiffener, thereby proving the patterned veneer appearance. The wood sheet of the present invention may have improved physical properties and reduced weight and may be manufactured with reduced cost.

BACKGROUND

Materials having a patterned veneer texture have been widely used to exhibit external natural beauty and high-quality elegant effects as various interior and exterior materials.

Real wood materials having a patterned veneer texture are used in interior and exterior materials, various structures, vehicle interior materials, and electric and electronic products and the like, and are typically prepared and used in a sheet form for manufacturing process and natural appearance.

The wood sheet generally having a multilayer structure includes a patterned veneer attached to an external-most layer of a stiffener in which an aluminum sheet is inserted between veneers, as shown in FIG. 1, and thus suitable form of sheets may be manufactured. In other words, as shown in FIG. 1, a conventional real wood sheet is formed with 7 layers that include: a patterned veneer (1), an adhesive layer (2), a technical veneer (3), an adhesive layer (4), an aluminum sheet (5), an adhesive layer (6) and a veneer layer as an internal layer adjacent to an ejected substrate (7), and is applied to the ejected substrate (8). Since three adhesive layers and an aluminum sheet are inserted between veneers, manufacturing costs may increase due to the complicated manufacturing process.

Meanwhile, in the related art, a wood sheet in an automotive interior material obtained by injection molding a resin has been developed. The wood sheet is formed with a patterned veneer layer formed on the ejected resin surface, and a strength stiffener such as non-woven fabric attached to the bottom of the patterned veneer as an adhesive, and an elastic layer formed by spraying or coating a material selected from polyurethane, rubber or silicone that provides softness to the patterned veneer at the bottom, and an ejected resin substrate. The wood sheet may be used for vehicle interior materials such as dash board exterior panels, instrument exterior panels, audio deck exterior panels, mission box exterior panels and door trim exterior panels.

Although the above real wood sheet has a fairly advanced structure compared to conventional wood sheets, however, it has a complicated structure with a patterned veneer, an adhesive, a stiffener, an elastic layer and the like, and thus, many defects may occur during the processes in which the adhesive and the elastic layer are used.

In addition, in other related example, a molding method of a resin mold component having a wooden board as a surface material has been reported. The wooden board includes a protective board attached to the reverse side of a patterned veneer or wooden decorative board as an adhesive.

However, the above structure also has a problem. For example, the patterned veneer and the protective board are readily delaminated due to heterogeneity between them, and consequently, durability is inferior, and weight thereof may not be reduced sufficiently.

The above information disclosed in this Background section is only for enhancement of understanding of the background of the invention and therefore it may contain information that does not form the prior art that is already known in this country to a person of ordinary skill in the art.

SUMMARY OF THE INVENTION

In a preferred aspect, the present invention provides a wood sheet which may have substantially improved physical properties and reduced weight and be manufactured with reduced cost. The wood sheet may be prepared with a conventional natural wood sheet such as a patterned veneer, a binder and a stiffener.

Accordingly, the wood sheet may be formed with a simple structure of a patterned veneer, a binder and a stiffener, and may have substantially improved moldability and physical properties while having reduced weight.

In a further preferred aspect, provided is a method for manufacturing a wood sheet prepared with a simple structure of a patterned veneer, a binder and a stiffener.

In an exemplary embodiment, the wood sheet may include a patterned veneer, an adhesive soft binder, and a stiffener. In particular, the binder may have a melting temperature of about 80 to 200° C. and the stiffener may be formed with non-woven fabric of 30 to 200 g/m$^2$.

In an exemplary embodiment, the method for manufacturing a real wood sheet may include: preparing a patterned veneer, an adhesive soft binder and a stiffener; cutting the prepared patterned veneer and a binder-attached stiffener prepared from the adhesive soft binder and the stiffener into primary shapes; providing the primary shaped patterned veneer and the binder-attached stiffener in a mold having a target shape; and press molding the mold provided with the patterned veneer and the binder-attached stiffener to form a wood sheet through pressing. In particular, the binder may have a melting temperature of about 80 to 200° C. and the stiffener may be formed with non-woven fabric of 30 to 200 g/m$^2$.

Further provided are injection molded products including the wood sheet as described herein. Still further provided are vehicles including automotive vehicles, that use or comprise the wood sheet of the invention as an interior or exterior material.

The wood sheet according to the present invention may include natural wood having simplified structure and reduced weight, and may be manufactured to have substantially improved physical properties without using an aluminum sheet. Accordingly, high-quality interior materials for various interior products may be provided.

In addition, according to the present invention, a high-quality wood sheet may be manufactured with reduced cost and simple process, and thus may be used as interior components for various structures at low costs.

Particularly, luxurious appearance of products may be provided and product values may be increased economically when the wood sheet of the present invention is used for vehicle interior components or home appliances.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
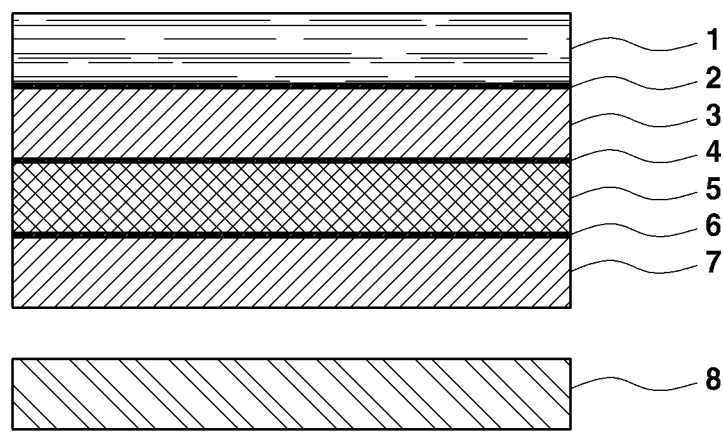
FIG. 1 illustrates a cross-sectional view of a wood sheet using a conventional aluminum sheet in the related arts.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
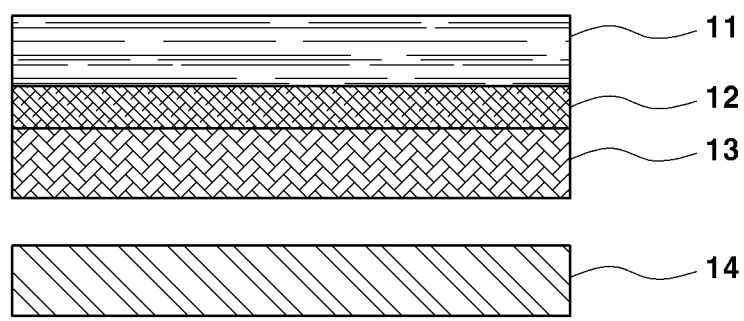
FIG. 2 illustrates a cross-sectional view of an exemplary wood sheet according to an exemplary embodiment of the present invention.

The present invention relates to, as shown in FIG. 2, a wood sheet may be formed with a patterned veneer (11), an adhesive soft binder (12) and a stiffener formed with non-woven fabric (13), and thus, the wood sheet may have a simplified structure. In particular, the stiffener (13) may directly contact with an ejected substrate (14).

According to the present invention, the patterned veneer may be located at the top layer of the wood sheet in a sliced shape, and thus provide an improved wood texture to the exterior and the surface. The patterned veneer may be formed in a thin plate veneer that is prepared by slicing a patterned natural wood or veneer and the like. Accordingly, the patterned veneer sheet having a desired exterior pattern may be used in a single sheet. The patterned veneer may have a thickness of about 0.2 to 1 mm, or particularly of about 0.4 to 0.8 mm.

The adhesive soft binder used in the present invention may have a melting temperature of about 80 to 200° C. The binder may have adhesive strength and further have a function to block ejection pressure during laminating with a stiffener. In addition, the binder may provide softness to the wood sheet, in contrast that conventional interlayer adhesives in a conventional wood sheet have only adhesive function. In addition, the binder may reduce the weight of the wood sheet as a substitute for a technical veneer and an aluminum sheet. As such, weight of the wood sheet may be reduced and manufacturing cost thereof may be reduced.

As described above, the binder of the present invention may provide adhesive strength and softness between a patterned veneer and a stiffener. The binder may be an organic adhesive, but not limited to, selected from urethane-based resin, acrylic-based resin, ester-based resin and amide-based resin. In particular, the binder may be selected from the group consisting of urethane-based hot melt (H/M), thermoplastic polyurethane (TPU) and ethylene vinyl acetate (EVA). Further, thermoplastic polyurethane resin may be used as the binder. Due to optimal use of the binder, improved adhesive strength may be provided between the patterned veneer and the stiffener, aggregation inside the binder may be improved surface tacky property may be adjusted.

The binder may have a melting temperature of about 80 to 200° C. When the melting temperature is less than a predetermined temperature or less than about 80° C., adhesive strength may be reduced and layer delamination may occur in the wood sheet, thereby deteriorating various properties. When the melting temperature is greater than about a predetermined temperature of greater than about 200° C., the processing temperature needs to be increased substantially for obtaining an adhesive property during the process for manufacturing the wood sheet. In such substantially elevated temperature, the patterned veneer may be carbonized, or a binder may leak to the surface through pores in the patterned veneer, thereby generating undesirable gloss on the surface of the patterned veneer. Particularly, when the binder is used as an interior material, for example, interior components for a vehicle exposed under sunlight or hot weather condition, light resistance may be required. Accordingly, the binder with non-yellowing property and having a melting temperature of 120 to 200° C. may be particularly used for heat resistance and light resistance.

The binder may be applied by generally used methods in the arts, such as melting or spraying, or may be applied as liquid or solid binder. Particularly, the binder may be prepared and processed in a sheet or film form, or the binder may be laminated in advance by layering on a stiffener during press molding process for manufacturing the wood sheet. When a liquid or solid binder is used, layer delamination may occur due to nonuniform adhesion, or mold attachment may occur due to substantial adhesion thereby causing defects.

The stiffener, as used herein, may be adjacent to the binder and the stiffener may be formed with a non-woven fabric of about 30 to 200 g/m$^2$, or particularly of about 70 to 120 g/m$^2$. The stiffener may adhere to an ejected material, and may serve as a back sheet of the wood sheet as adhering to the binder. As such, the stiffener may provide rigidity to the real wood sheet.

The stiffener may be a non-woven fabric having strength capable of replacing an aluminum sheet and enduring ejection pressure as being laminated with the binder after molding. Further, the stiffener may provide improved moldability. Accordingly, the non-woven fabric without textures may be used instead of knit having a directional property. In addition, in the wood sheet molding process, when a product is removed from the mold after an injection molding and a PUR (Polyurethane RIM) process, adhesive force at the interfaces may be advantageous. When the adhesive power is less than a predetermined value, delamination may occur at the interfaces in the wood sheet product. In addition, when short fiber non-woven fabric is used, delamination at the interfaces between non-woven fabric may occur, and accordingly, long fiber non-woven fabric having high tensile strength prepared by a span bond or a needle punching may be used. Particularly, the non-woven fabric spun may be a mixture of polyethylene terephthalate (PET) and nylon. The weight ratio of PET and nylon in the non-woven fabric spun may be in a ratio between about 8:2 and 7:4. For example, filaments of the two components of PET and nylon may be spun as microfilaments and separated into several threads. When non-woven fabric is used as a back sheet and or a stiffener to maintain rigidity, molding and physical properties such as elongation may be improved.

Moreover, when the wood sheet described above is used for injection molding product, the stiffener may use non-woven fabric having a density of about 30 to 200 g/m$^2$ to provide desired adhesive property with the injection molding product material and to improve the rigidity as a back sheet capable of enduring ejection pressure. As such, the wood sheet may be formed with substantial physical properties or binder may not be exposed to the surface. The non-woven fabric may have a thickness of about 0.4 to 2.0 mm, or particularly of about 0.4 to 1.0 mm. In addition, the non-woven fabric may be a long fiber non-woven fabric.

The wood sheet according to the present invention having a structure as described above may include natural wood pattern and have simplified structure and reduced weight. The wood sheet may also be prepared to have improved physical properties without using an aluminum sheet, and thus, may be economically used as a high-quality plaster in interior products with various wood textures.

Meanwhile, the real wood sheet according to the present invention such as above may be manufactured by cutting raw materials such as a patterned veneer, an adhesive soft binder and a stiffener into primary shapes, providing the cut materials in a mold having a target shape, and then press molding the cut materials.

Figure 3:
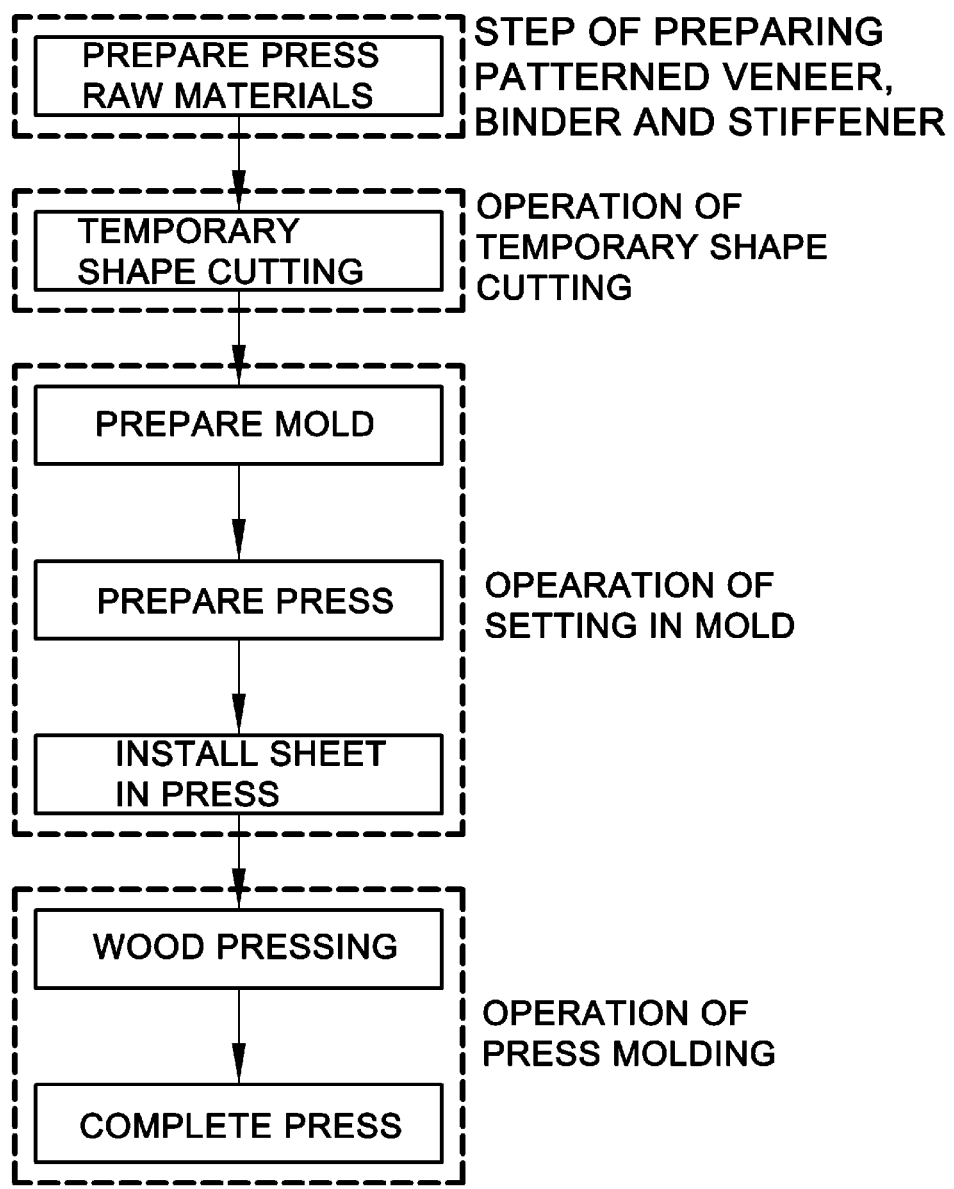
FIG. 3 illustrates an exemplary process of manufacturing an exemplary wood sheet according to an exemplary embodiment of the present.

In FIG. 3, exemplary processes for manufacturing the wood sheet according to an exemplary embodiment of the present invention are illustrated. The method for manufacturing a wood sheet typically include: preparing raw materials such as a patterned veneer, a binder and a stiffener; cutting the raw materials into primary shapes; proving the cut materials in a mold; press molding such as wood pressing, completing pressing and the like. An operation of providing the cut material in the mold may include: preparing mold, preparing press and installing sheet inside the press mold.

The patterned veneer may be prepared as a single sheet as described above and the binder may be prepared with the adhesive soft binder having a melting temperature of about 80 to 200° C. in a sheet or film form. The stiffener may be either prepared with a stiffener made of non-woven fabric in a separate sheet form or prepared in the form of a stiffener formed with non-woven fabric having density of about 30 to 200 g/m$^2$ being laminated with the adhesive soft binder. Particularly, as described above, the binder may be coated on the stiffener using common methods and prepared in a laminated form, or the binder may be prepared in a sheet or film form, and then the formed binder may be simultaneously laminated with the stiffener and a wood press. Alternatively, the patterned veneer, the binder in a sheet or film form, and the stiffener may be independently prepared in each sheet form. When the binder is prepared in a sheet or film form, the thickness may be of about 0.3 to 1.5 mm, or particularly of about 0.4 to 0.8 mm for lamination or typical pressing conditions.

The prepared patterned veneer, the binder and the stiffener may be laminated in sequential order, and may be cut into the primary shapes. As used herein, the "primary shape cutting" means that the a primary shape may be determined temporarily into a rough to form in a sufficient size for obtaining the final shape of the wood sheet. As such, for subsequent pressing, materials may be cut into the primary shape sufficient for press molding. An operation of cutting may be performed by adjusting the patterned veneer, the binder, the stiffener and the like into the primary shapes particularly using laser.

The cut materials, i.e. patterned veneer, binder and stiffener, may be provided to a mold having a target shape. The mold may be prepared to have a shape matching to a component to be manufactured, and the process herein may include: preheating the mold to a temperature of about 130 to 160° C. in advance for press molding and removal of mold thereafter, setting the pressure to about 25 to 35 bar, and preparing the mold by waxing the mold surface. In addition, the mold may be prepared in a press capable of adjusting temperatures, pressures and times for press molding.

The real wood sheet may be manufactured after pressing the primary shaped sheets set in the mold, and then molding the sheets into the wood sheet. In particular, the mold may be opened at about 2 to 5 mm after first pressing and then second pressing may be carried out to remove the gas generated in the sheet during the press molding process and to prevent molding defects.

The wood sheet according to the present invention manufactured as described above may be further injection molded by ejecting the molded component The injection molding may be carried out on the stiffener surface of the wood sheet and a molding product may be obtained by injection molding with the wood sheet.

As such, an injection molded product including the wood sheet according to the present invention may be provided.

The injection molding products may include vehicle interior components or vehicle interior products such as dash board exterior panels, instrument exterior panels, mission box exterior panels, door trim exterior panels, audio deck exterior panels and the like.

As described above, according to various exemplary embodiment of the present invention, the high-quality wood sheet may be obtained with simplified structure than conventional wood sheets, and further may have a combined structure by injection molding, such that the product obtained with the wood sheet may have unique properties in an economical and simple manufacturing. Consequently, the wood sheet and the method of manufacturing thereof may be applied to other interior components of various structures at reduced costs.

Particularly, the wood sheet according to the present invention may have improved durability and substantially improved quality textures when used for vehicle interior components, home appliances, indoor interior materials or the like, and thus, product values may be improved by high-quality and reduced-weight thereof at reduced cost.

EXAMPLES

Hereinafter, the present invention will be described in more detail with reference to an example, however, the present invention is not limited to the example.

Example

A natural patterned veneer having length, width and thickness of about 0.5 mm for the size of a component to be molded was prepared. An adhesive soft binder made of a polyurethane resin having melting point of about 120° C. and a thickness of about 0.4 mm and the same sized patterned veneer was prepared. In addition, as a stiffener, non-woven fabric having thickness of about 0.5 mm and density of about 100 g/m² formed with PET and nylon-6 in a weight ratio of about 7:3 was prepared to have the same size as described above.

The binder was prepared by being laminated to the stiffener in advance using a T-die method.

The patterned veneer and the binder-laminated stiffener prepared as described above were cut into primary shapes for a vehicle interior component such as door trim exterior panel using laser, and the cut material was provided to a press mold in which the temperature was adjusted to about 140° C., the pressure to about 30 bar for about 180 sec for laminating. Thus the sheet was fixed. Herein, the mold was preheated to about 150° C. and the surface thereof was treated by waxing.

The primary shaped sheets provided to the mold were fixed at the corner holes of the press mold under the condition as described above, and was pressed. The molding was completed by opening by about 3 mm after first pressing, and then carrying out second pressing, and thus, a wood sheet for a door trim exterior panel was manufactured which may be used for a vehicle interior component.

Comparative Examples 1 to 5

Comparative examples were carried out as described in Example, but conditions listed in Table 1 were applied for each comparative example.

TABLE 1

| Category | | Example 1 | Comparative Example 1 | Comparative Example 2 | Comparative Example 3 | Comparative Example 4 | Comparative Example 5 |
|---|---|---|---|---|---|---|---|
| Patterned Veneer | Thickness (mm) | 0.5 | 0.1 | 0.4 | 0.5 | 0.5 | Product having a structure of FIG. 1 |
| Binder | Thickness (mm) | 0.4 | 0.4 | 0.2 | 0.4 | 0.4 | |
| | Melting Point (° C.) | 120 | 120 | 120 | 70 | 120 | |
| Stiffener | Weight (g/m²) | 100 | 100 | 100 | 100 | 20 | |

Test Example

Physical properties were measured comparing to the physical properties of the wood sheets of Example and Comparative Examples having constitutions of Table 1 and FIG. 1 and the results are shown in the following Table 2.

Herein, the physical properties were measured using the methods shown below.

[Physical Property Measurement Method]

1) Moisture Resistance

Test pieces were left unattended for about 168 hours in a chamber under a condition of a test temperature of about 50±2° C. and relative humidity of about 95±2% RH, and then were taken out for exterior evaluation such as discoloration, fading, swelling, surface cracks, loss of gloss and interlayer cracks and the like were identified.

2) Heat Resistance

Test pieces were left unattended for 300 hours in a chamber under a condition of a test temperature of about 80±2° C., and then were taken out for surface exterior evaluation such as discoloration, fading, swelling, surface cracks, loss of gloss and interlayer cracks and the like were identified.

3) Light Resistance

After test pieces were irradiated under XENON ARC until total accumulated quantity of light reached about 700 KJ/m² under a condition of a black panel temperature of about 89±3° C., inside humidity of about 50±5% RH and irradiation intensity of about 0.55±0.02 W/m² (at a wavelength of about 340 nm), the test pieces were taken out, and the painted test pieces were washed with an aqueous neutral detergent solution and dried with air for exterior evaluation such as discoloration, fading, swelling, surface cracks, loss of gloss and interlayer cracks and the like were identified.

4) Thermal Cycling Resistance Property

A cycle of [80±2° C.×3 h→room temperature 1 h→−40° C.×3 h→room temperature 1 h→50±2° C., 95% RH or higher×7 h→room temperature 1 h] was repeated 3 times, and then the test pieces were taken out for surface exterior evaluation such as discoloration, fading, swelling, surface cracks, loss of gloss and interlayer cracks and the like were identified.

TABLE 2

| Category | Example 1 | Comparative Example 1 | 2 | 3 | 4 | 5 |
|---|---|---|---|---|---|---|
| moisture resistance | ◎ | Δ | Δ | X | X | Δ |
| heat resistance | ◎ | ○ | ○ | X | Δ | ○ |
| Light Resistance | ◎ | Δ | ○ | Δ | ○ | ◎ |
| Thermal Cycling Resistance Property | ◎ | ○ | Δ | X | Δ | ○ |

◎: Very Excellent
○: Excellent
Δ: Fair
X: Poor

As shown in Table 2, the product of the present invention was identified to have substantially improved physical properties except when the patterned veneer had a thickness less than the range as described above (Comparative Example 1) or when the binder was treated less than the range as described above (Comparative Example 2). Accordingly, the product of Example 1 according to the present invention was identified to have substantially improved physical properties with simplified structure reduced weight compared to the conventional product of Comparative Example 5. Further, in Comparative Examples 1 and 2, the products were manufactured to have a structure of the present invention, but physical properties thereof were similar to the conventional product of Comparative Example 5.

However, in applying the present invention, when the melting point of the binder was less than or out of the range as described (Comparative Example 3), or when the density of the non-woven fabric was less than the density range as described above (Comparative Example 4), products qualities were inferior so real products were not obtained.

According to the present invention, a high-quality wood sheet having simplified structure from the conventional wood sheets may be obtained, and may also be manufactured as a reduced weight product in an economical and simple process, as such, the wood sheet and the method of manufacturing thereof may be applied to interior components of various structures at low costs Particularly, the wood sheet according to various embodiments of the present invention may be used for vehicle interior components, home appliances, interior decorating products or the like as a high-quality interior material with wood textures.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A wood sheet, consisting of:
a patterned veneer having a thickness of about 0.2 to 0.5 mm;
an adhesive soft binder having a melting temperature of about 80 to 200° C. and a thickness of about 0.3 to 0.4 mm; and
a stiffener comprising a non-woven fabric having an area density of about 30 to 200 g/m$^2$,
wherein the non-woven fabric comprises a mixture of polyethylene terephthalate (PET) and nylon-6 in a weight ratio of about 8:2 to 7:4, and the mixture of the polyethylene terephthalate (PET) and the nylon are spun as microfilaments and separated into several threads, and
wherein the patterned veneer, the adhesive soft binder and the stiffener are pressed.

2. The wood sheet of claim 1, wherein the binder is selected from urethane-based resin, acrylic-based resin, ester-based resin and amide-based resin.

3. The wood sheet of claim 1, wherein the binder is selected from the group consisting of urethane-based hot melt (H/M), thermoplastic polyurethane (TPU) and ethylene vinyl acetate (EVA).

4. The wood sheet of claim 1, wherein the binder has a melting temperature of about 120 to 200° C.

5. The wood sheet of claim 1, wherein the non-woven fabric is a long fiber non-woven fabric.

6. An injection molded product including the wood sheet of claim 1.

7. The injection molded product of claim 6, which is a vehicle interior product.

8. A vehicle comprising an injection molded product of claim 6.

* * * * *